United States Patent
Suzuki

(10) Patent No.: US 12,335,449 B2
(45) Date of Patent: Jun. 17, 2025

(54) IMAGE FORMING APPARATUS, SERVER, AND SYSTEM FOR USE WITH APPARATUS OR CONSUMABLE CONTRACTS

(71) Applicant: BROTHER KOGYO KABUSHIKI KAISHA, Nagoya (JP)

(72) Inventor: Takashi Suzuki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/413,269

(22) Filed: Jan. 16, 2024

(65) Prior Publication Data
US 2024/0333857 A1    Oct. 3, 2024

(30) Foreign Application Priority Data

Mar. 29, 2023  (JP) .................. 2023-054124

(51) Int. Cl.
*H04N 1/34* (2006.01)
*H04N 1/00* (2006.01)
*H04N 1/32* (2006.01)

(52) U.S. Cl.
CPC ......... *H04N 1/346* (2013.01); *H04N 1/00244* (2013.01); *H04N 1/0048* (2013.01); *H04N 1/00514* (2013.01); *H04N 1/00925* (2013.01); *H04N 1/32673* (2013.01); *H04N 1/344* (2013.01)

(58) Field of Classification Search
CPC .. H04N 1/346; H04N 1/00244; H04N 1/0048; H04N 1/00514; H04N 1/00925; H04N 1/32673; H04N 1/344
See application file for complete search history.

(56) References Cited

U.S. PATENT DOCUMENTS

| | | | | |
|---|---|---|---|---|
| 2018/0076952 | A1* | 3/2018 | Kono | H04L 9/083 |
| 2021/0306516 | A1* | 9/2021 | Yamada | G06F 3/1239 |
| 2022/0103717 | A1* | 3/2022 | Yamada | G06F 3/1285 |
| 2023/0089862 | A1* | 3/2023 | Sugiyama | H04N 1/00344 358/1.15 |
| 2023/0385003 | A1* | 11/2023 | Masumitsu | G06F 3/1203 |

FOREIGN PATENT DOCUMENTS

WO    2014/120199 A1    8/2014

* cited by examiner

*Primary Examiner* — Nicholas Pachol
(74) *Attorney, Agent, or Firm* — Merchant & Gould P.C.

(57) ABSTRACT

An apparatus memory is configured to store mode information indicating one of a first contract mode, a second contract mode, and a commercial mode. The first contract mode is a mode in which an apparatus contract for an apparatus main body and a consumable contract for a consumable are set. The second contract mode is a mode in which the apparatus contract is not set and the consumable contract is set. The commercial mode is a mode in which neither the apparatus contract nor the consumable contract is set. A controller is configured to perform: receiving first cancellation information of the first contract mode from a server via a communication interface; and in response to receiving the first cancellation information of the first contract mode from the server, switching the mode information from the first contract mode to the second contract mode or the commercial mode.

15 Claims, 7 Drawing Sheets

| | NORMAL CARTRIDGE (COMMERCIAL CONSUMABLE) | CONTRACT-DEDICATED CARTRIDGE (CONTRACT CONSUMABLE) |
|---|---|---|
| COMMERCIAL MODE | USABLE | UNUSABLE |
| APPARATUS AND CONSUMABLE CONTRACT MODE | UNUSABLE | USABLE |
| CONSUMABLE CONTRACT MODE | USABLE (NOT CHARGED) | USABLE |

FIG. 7

| | NORMAL CARTRIDGE (COMMERCIAL CONSUMABLE) | CONTRACT-DEDICATED CARTRIDGE (CONTRACT CONSUMABLE) |
|---|---|---|
| COMMERCIAL MODE | USABLE | UNUSABLE |
| APPARATUS AND CONSUMABLE CONTRACT MODE | UNUSABLE | USABLE |
| CONSUMABLE CONTRACT MODE | USABLE (NOT CHARGED) | USABLE |

IMAGE FORMING APPARATUS, SERVER, AND SYSTEM FOR USE WITH APPARATUS OR CONSUMABLE CONTRACTS

REFERENCE TO RELATED APPLICATIONS

This application claims priority from Japanese Patent Application No. 2023-054124 filed on Mar. 29, 2023. The entire content of the priority application is incorporated herein by reference.

BACKGROUND ART

In recent years, a flat-rate printing service has been widely provided to users who use image forming apparatuses. The flat-rate printing service is also called a subscription service. For example, in an image forming apparatus which is a contract apparatus for which a contract for use of a flat-rate printing service is set, printing is permitted at a fixed usage fee for a particular period of time up to a preset number of sheets.

SUMMARY

In such a subscription service, there is a contract in which a user is allowed to use an image forming apparatus dedicated to the contract provided by a business operator at a fixed rate per month by setting an "apparatus contract" with the business operator. There is a desire that, when the contract period of the apparatus contract for the image forming apparatus and the consumable thereof expires, the user may select whether to set another contract (contract mode for only the consumable) or not to set any contract (commercial mode).

In view of the foregoing, an example of an object of this disclosure is to provide an image forming apparatus configured to meet a user's desire when a contract period of an apparatus contract for the image forming apparatus and consumables thereof expires.

According to one aspect, this specification discloses an image forming apparatus. The image forming apparatus includes an apparatus main body, a consumable attachable to the apparatus main body, a communication interface configured to communicate with a server, an apparatus memory, and a controller. The apparatus memory is configured to store mode information indicating one of a first contract mode, a second contract mode, and a commercial mode. The first contract mode is a mode in which an apparatus contract for the apparatus main body and a consumable contract for the consumable are set. The second contract mode is a mode in which the apparatus contract is not set and the consumable contract is set. The commercial mode is a mode in which neither the apparatus contract nor the consumable contract is set. The controller is configured to perform: receiving first cancellation information of the first contract mode from the server via the communication interface. Thus, the image forming apparatus receives the first cancellation information of the first contract mode. The controller is configured to perform: in response to receiving the first cancellation information of the first contract mode from the server, switching the mode information from the first contract mode to the second contract mode or the commercial mode. Thus, the image forming apparatus switches the mode information from the first contract mode to the second contract mode or the commercial mode. In a case where the mode information is switched from the first contract mode to the second contract mode, the apparatus contract is canceled while continuing the consumable contract. Thus, the user pays the contract fee for the consumable contract without paying the contract fee for the apparatus contract, and thus periodic expenses are suppressed. In a case where the mode information is switched from the first contract mode to the commercial mode, the apparatus contract and the consumable contract are cancelled. This eliminates periodic expenses for the user, and the printing cost are reduced.

According to another aspect, this specification also discloses a server. The server includes a communication interface, a server memory, and a server controller. The communication interface is configured to communicate with a user terminal and an image forming apparatus. The server memory is configured to store contract mode information in association with the image forming apparatus. The contract mode information indicates one of a first contract mode and a second contract mode. The first contract mode is a mode in which an apparatus contract and a consumable contract are set. The apparatus contract is a contract for an apparatus main body of the image forming apparatus. The consumable contract is a contract for a consumable attachable to the apparatus main body. The second contract mode is a mode in which the apparatus contract is not set and the consumable contract is set. The server controller is configured to perform: receiving cancellation information of the first contract mode of the image forming apparatus from the user terminal via the communication interface. Thus, the server receives the cancellation information of the first contract mode of the image forming apparatus. The server controller is configured to perform: in response to receiving the cancellation information of the first contract mode of the image forming apparatus from the user terminal, transmitting a first condition to the user terminal. The first condition includes the second contract mode, a commercial mode, or return of the apparatus main body. The second contract mode is executable after cancellation of the first contract mode. The commercial mode is neither the first contract mode nor the second contract mode. Thus, the server transmits the first condition to the user terminal. This allows the user to easily select the first condition after cancellation of the contract. The server controller is configured to perform: receiving selection of the first condition from the user terminal via the communication interface. Thus, the server receives selection of the first condition. The server controller is configured to perform: updating the contract mode information of the image forming apparatus with the received selection of the first condition. Thus, the server updates the contract mode information of the image forming apparatus with the received selection of the first condition. The server controller is configured to perform: transmitting the updated contract mode information to the image forming apparatus via the communication interface. Thus, the server transmits the updated contract mode information to the image forming apparatus. This allows the image forming apparatus having received the updated contract mode information to update the contract mode.

According to still another aspect, this specification also discloses a system. The system includes an image forming apparatus, a server configured to communicate with the image forming apparatus, and a user terminal configured to communicate with the server. The image forming apparatus includes an apparatus main body, a consumable attachable to the apparatus main body, an apparatus communication interface, an apparatus memory, and an apparatus controller. The server includes a server communication interface, a server memory, and a server controller. The server memory is configured to store contract mode information in association with the image forming apparatus. The contract mode information indicates one of a first contract mode and a second contract mode. The first contract mode is a mode in which an apparatus contract and a consumable contract are set. The apparatus contract is a contract for the apparatus main body of the image forming apparatus. The consumable contract is a contract for the consumable. The second contract mode is a mode in which the apparatus contract is not set and the consumable contract is set. The server controller is configured to perform: receiving cancellation information of the first contract mode of the image forming apparatus from the user terminal via the server communication interface. Thus, the server receives the cancellation information of the first contract mode of the image forming apparatus. The server controller is configured to perform: in response to receiving the cancellation information of the first contract mode of the image forming apparatus from the user terminal, transmitting a first condition to the user terminal. The first condition includes the second contract mode that is executable after cancellation of the first contract mode, a commercial mode that is neither the first contract mode nor the second contract mode, or return of the apparatus main body. Thus, the server transmits the first condition to the user terminal. This allows the user to easily select the first condition after cancellation of the contract. The server controller is configured to perform: receiving selection of the first condition from the user terminal via the server communication interface. Thus, the server receives selection of the first condition. The server controller is configured to perform: updating the contract mode information of the image forming apparatus with the received selection of the first condition. Thus, the server updates the contract mode information of the image forming apparatus with the received selection of the first condition. The server controller is configured to perform: transmitting the updated contract mode information to the image forming apparatus via the server communication interface. Thus, the server transmits the updated contract mode information to the image forming apparatus. This allows the image forming apparatus having received the updated contract mode information to update the contract mode.

BRIEF DESCRIPTION OF DRAWINGS

FIG. 7 is a table for explaining an example of combinations of contract modes of the MFP and usable consumables.

DESCRIPTION

Embodiment 1

Hereinafter, Embodiment 1 of the present disclosure will be described with reference to FIGS. 1 to 7. In the present embodiment, as an example, an image forming apparatus is a so-called multifunction printer or multifunction peripheral (MFP) having a plurality of functions including a printing function, a scanner function, and a facsimile transmission and reception function. In this example, the printing function is configured by a laser printer.

[Overview of Image Forming System]

Figure 1:
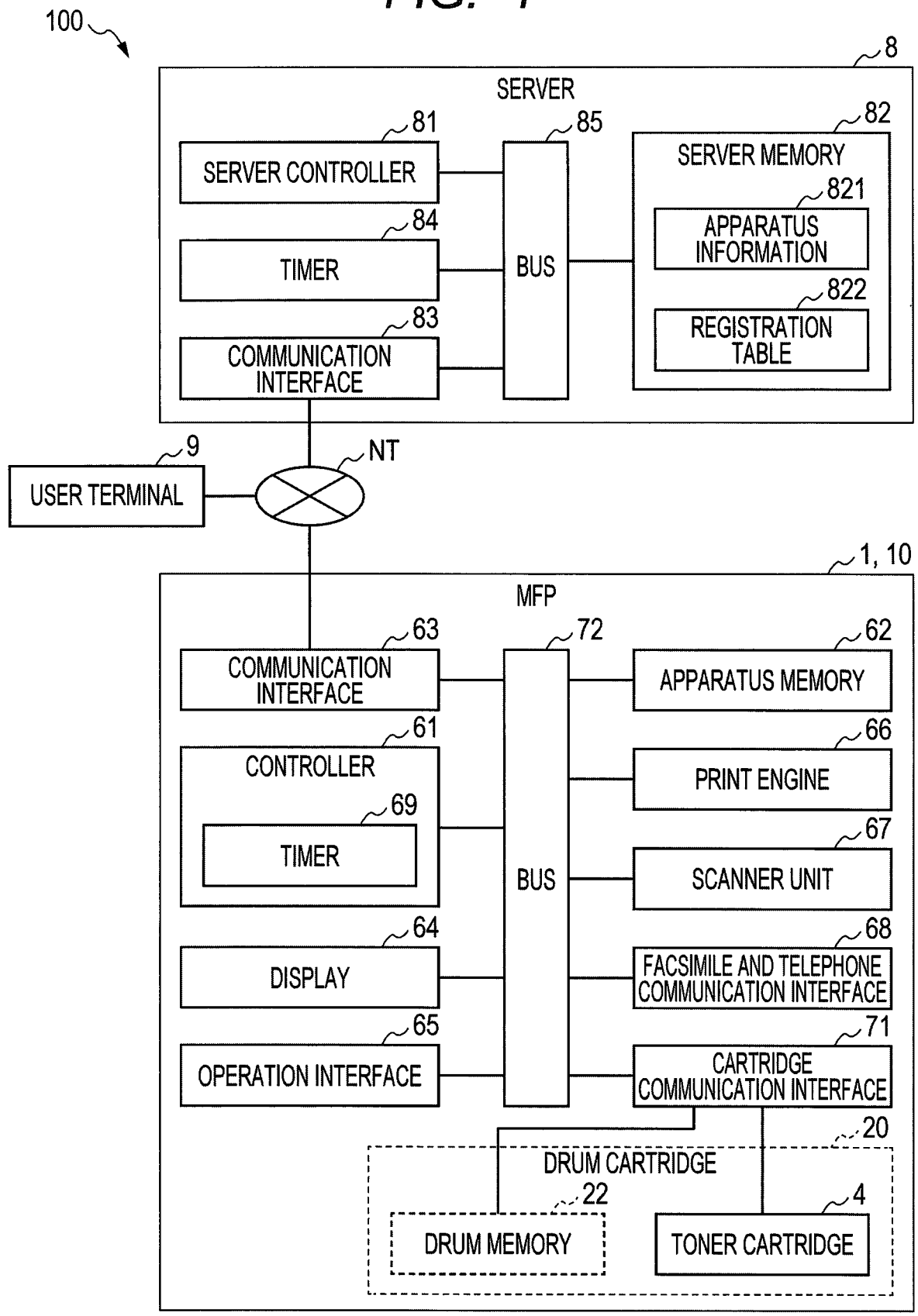
FIG. 1 is a block diagram showing an overall schematic configuration of an image forming system.

FIG. 1 is a block diagram showing an overall schematic configuration of an image forming system 100 of the present embodiment. As shown in FIG. 1, the image forming system 100 includes an MFP 1, a server 8, and a user terminal 9.

The MFP 1 is an apparatus for realizing a service provided by setting a contract such as an "apparatus contract" or a "consumable contract" described later with respect to the MFP 1. The MFP 1 can also be said to be an apparatus that is a contract target. Hereinafter, the contract-target MFP 1 which is designated by a user or provided to a user from a business operator is also referred to as a "contract target apparatus".

For example, the user sets an "apparatus contract" which is an example of a "contract" with the business operator. With this contract, the user is provided with a service that allows the user to use a contract-dedicated apparatus main body 10 provided by the business operator at a fixed rate every month, for example. Thus, when the user sets the "apparatus contract" with the business operator, the ownership of the MFP 1 belongs to the business operator. When the user purchases the MFP 1 and does not set the "apparatus contract" with the business operator, the ownership of the MFP 1 belongs to the user.

For example, the user sets a "consumable contract", which is an example of a "contract", with the business operator. This allows the user to use a contract-dedicated consumable dedicated to the contract at a fixed rate every month, for example. Setting these contracts mean that a business operator providing a service and a user agree that the business operator provides the service in a state where a service use period, a service use fee (also referred to as contract fee), and so on are arranged between the business operator and the user.

That is, after the "consumable contract" is set, the MFP 1 of the present embodiment performs printing using a contract-dedicated consumable (hereinafter, also referred to as "contract printing") based on the content of the set contract.

In the MFP 1 of the present embodiment, after the "apparatus contract" is set, the user is allowed to use the contract-dedicated apparatus main body 10 based on the content of the set contract. That is, after the "apparatus contract" is set, the user is allowed to use the MFP 1 for which the contract is set.

When a user sets the "apparatus contract", the user may also set the "consumable contract" at the same time. By setting the "apparatus contract" and the "consumable contract", the user is allowed to perform contract printing using the contract-dedicated consumable by the MFP 1 that is the contract-dedicated apparatus main body 10.

[User Terminal 9]

The user terminal 9 used by the user is an apparatus for performing the setting and cancellation of a contract and other procedures by communicating with the server 8. As the user terminal 9, for example, an information processing terminal having a standard communication function, such as a personal computer (PC) or a smartphone, may be employed. The user may instruct the MFP 1 to print via the user terminal 9, and may print a desired number of sheets using the contract-dedicated consumable. The user terminal 9, the server 8, and the MFP 1 constituting the image forming system 100 communicate with one another via a network NT such as the Internet.

The user terminal 9 includes a controller and an input interface for receiving various input operations of the user and a communication interface for communicating with the server 8. The user registers the contract target apparatus of the "consumable contract" in the server 8 by performing an input operation via the user terminal 9. For example, the user inputs, to the user terminal 9, his or her own identification information and identification information of the MFP 1 to be the contract target apparatus of the "consumable contract". In response to receiving the input, the user terminal 9 transmits the input information to the server 8.

[Server 8]

The server 8 is an external apparatus that communicates with the MFP 1 via the network NT, and is an example of a management apparatus that manages the operation state of the MFP 1. In the present embodiment, the server 8 is a server managed by the business operator. As shown in FIG. 1, the server 8 includes a server controller 81, a server memory 82, a communication interface 83, and a timer 84. The server controller 81, the server memory 82, the communication interface 83, and the timer 84 are connected to one another via a bus 85. The server controller 81 is a central processing unit (CPU) that performs overall control of the server 8. The server memory 82 is a storage device that stores data necessary for the operation of the server 8.

The server controller 81 updates a registration table stored in the server memory 82 in response to a notification or a request received from the MFP 1. The "registration table" is a data table in which an apparatus ID for identifying the MFP 1 designated as the contract target apparatus, a user name, and a user ID for identifying the user are registered (stored) in association with one another. The registration is performed by the user or the server 8. That is, the registration table includes information that associates the user with the MFP 1 that is the contract target apparatus. Further, the registration table stores an apparatus ID identifying the contract target apparatus and data indicating whether each of the "apparatus contract" and the "consumable contract" is currently in a contract state (under contract), in association with each other. That is, the "registration table" is also data indicating whether each contract target apparatus is currently under contract.

The server memory 82 includes an area 821 and an area 822. The server memory 82 stores the apparatus information in the area 821. The server memory 82 stores the registration table in the area 822. The areas 821 and 822 are rewritable areas. The apparatus information is data in which various kinds of information related to the MFP 1 are collected. The apparatus information is stored separately for each of the MFPs 1. The apparatus information includes at least the apparatus ID for identifying the MFP 1. The apparatus information may further include the cumulative number of printed matters printed by the MFP 1, the cumulative number of printed matters printed by the MFP 1 in the contract printing, the contract period of the apparatus contract, the contract fee of the apparatus contract, the payment deadline of the contract fee, information indicating that the contract fee has been paid or information indicating that the contract fee has not been paid, and so on in association with the apparatus ID.

The communication interface 83 is a wired interface or a wireless interface for communicating with the user terminal 9 and the MFP 1, and is connected to the network NT. The server controller 81 receives various data, notifications, and requests from the MFP 1 via the communication interface 83. The server controller 81 transmits various data, notifications, and requests to the MFP 1 via the communication interface 83.

For example, the server controller 81 receives the apparatus ID, the cumulative number of printed matters, and the cumulative number of printed matters printed in the contract printing from the MFP 1 via the communication interface 83. Then, the server controller 81 may store the received apparatus ID and the respective cumulative numbers in the area 821 of the server memory 82 as the apparatus information of the MFP 1 in association with one another.

[MFP 1]

As shown in FIG. 1, the MFP 1 includes a controller 61, an apparatus memory 62, a communication interface 63, a display 64, an operation interface 65, a print engine 66, a scanner unit 67, a facsimile and telephone communication interface 68, and a cartridge communication interface 71. The controller 61, the apparatus memory 62, the communication interface 63, the display 64, the operation interface 65, the print engine 66, the scanner unit 67, the facsimile and telephone communication interface 68, and the cartridge communication interface 71 are connected to one another via a bus 72.

In the MFP 1, in a state where the toner cartridge 4 is attached to the drum cartridge 20, the toner cartridge 4, together with the drum cartridge 20, is detachably attached to the apparatus main body 10. The drum cartridge 20 includes a photosensitive drum (not shown) as a component used for image formation. The drum cartridge 20 may include a drum memory 22. The drum memory 22 is a memory from which information is read and to which information is written. The drum memory 22 is, for example, a flash ROM (Read Only Memory) or an EEPROM (Electronically Erasable and Programmable Read Only Memory).

The drum memory 22 may store information relating to the photosensitive drum of the drum cartridge 20. The drum memory 22 may store a drum ID. The drum memory 22 may store drum life information. The drum ID is a unique serial number for identifying each drum cartridge 20. The drum life information is information indicating the life of the photosensitive drum.

Figure 2:
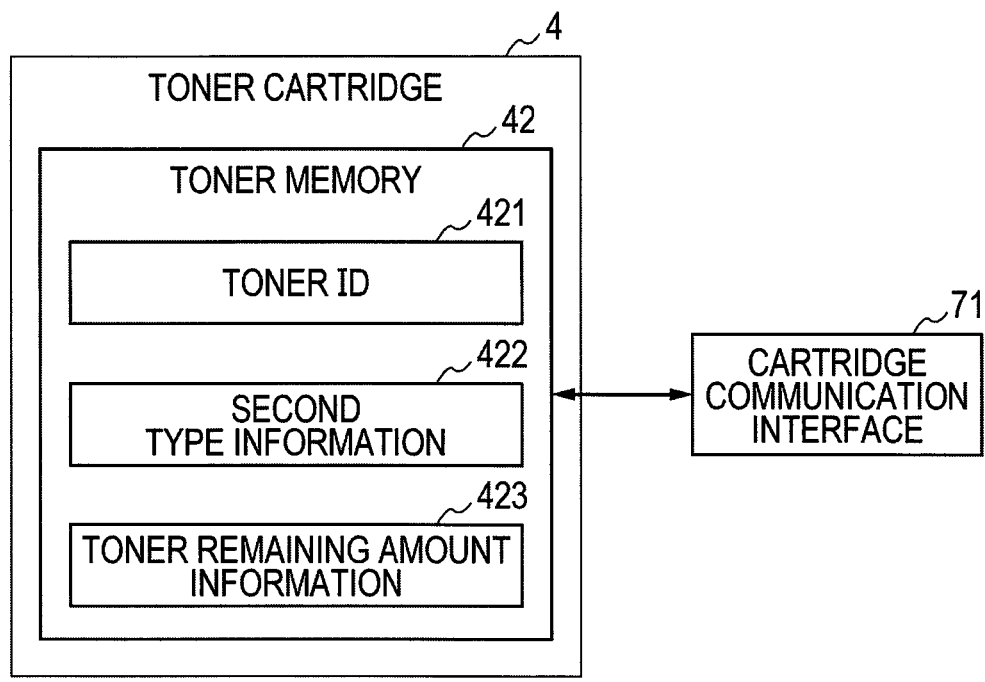
FIG. 2 is a block diagram showing an example of information stored in a toner memory of a toner cartridge.

As shown in FIG. 2, the toner cartridge 4 includes a toner memory 42 as an example of a consumable memory. The toner memory 42 is disposed on an outer surface of the toner cartridge 4. The toner memory 42 is a memory from which information is read and to which information is written, and is, for example, a flash ROM or an EEPROM.

The toner memory 42 includes a first area 421, a second area 422, and a third area 423 for storing information relating to the toner cartridge 4. The toner memory 42 stores a toner ID in the first area 421. The toner memory 42 stores second type information in the second area 422. The toner memory 42 stores toner remaining amount information in the third area 423. The third area 423 may be rewritable with data.

The toner ID is, for example, a unique serial number for identifying each toner cartridge 4. The toner ID may include information indicating the color of each toner cartridge 4.

The second type information is information representing the type of the toner cartridge 4. In the present embodiment, there are two types of the toner cartridge 4. One is a "contract-dedicated cartridge" as an example of a contract-dedicated consumable that is usable in the contract target apparatus and is unusable in apparatuses other than the contract target apparatus. The other is a "normal cartridge" as an example of a normal consumable that is also usable in the MFP 1 that is not the contract target apparatus. The second type information may be included in the toner ID. That is, the toner ID may be information for identifying each toner cartridge 4 and information indicating the type of each toner cartridge 4.

The toner remaining amount information is information indicating the toner remaining amount in the toner cartridge 4. The toner remaining amount includes values corresponding to a plurality of stages from full to empty, for example. The value corresponding to the toner remaining amount among the plurality of stages from full to empty is stored in the third area 423 as the toner remaining amount. Each level of the toner remaining amount stored in the toner memory 42 may be a character string such as "FULL" to "EMPTY", a numerical value such as "100%" to "0%", or information obtained by combining a character string and a numerical value, based on the above-described values.

The cartridge communication interface 71 is, for example, a terminal. The cartridge communication interface 71 is electrically connected to each of the drum memory 22 of the drum cartridge 20 attached to the apparatus main body 10 and the toner memory 42 of the toner cartridge 4 attached to the apparatus main body 10 together with the drum cartridge 20.

The controller 61 includes, for example, an ASIC (Application Specific Integrated Circuit). The controller 61 includes a timer 69 and is configured to measure time. The controller 61 executes various processes to enable the use of a plurality of functions including a printing function, a scanner function, and a facsimile transmission and reception function of the MFP 1.

The controller 61 may include a processor such as a CPU. In this case, the apparatus memory 62 may store a control program for realizing a plurality of functions including the printing function, the scanner function, and the facsimile transmission and reception function. The processor of the controller 61 may operate in accordance with the control program stored in the apparatus memory 62, thereby realizing the use of a plurality of functions including the printing function, the scanner function, and the facsimile transmission and reception function in the MFP 1.

The controller 61 itself may include a computer-readable storage medium storing the control program. As the storage medium, a "non-transitory tangible medium", for example, a tape, a disk, a card, a semiconductor memory, a programmable logic circuit, and so on may be used in addition to a ROM (Read Only Memory) and so on. Alternatively, a RAM (random access memory) and so on for expanding the control program may be used.

The control program may be supplied to the computer via any transmission medium (a communication network, a broadcast wave, and so on) that transmits the control program. Note that one aspect of the present disclosure may also be realized in the form of a data signal embedded in a carrier wave in which the control program is embodied by electronic transmission.

When the drum cartridge 20 and the toner cartridge 4 are attached to the apparatus main body 10, the drum memory 22 and the toner memory 42 are electrically connected to the controller 61 via the cartridge communication interface 71. The controller 61 becomes ready to execute a process of reading information from the drum memory 22 and the toner memory 42 via the cartridge communication interface 71. The controller 61 also becomes ready to execute at least a writing process or a rewriting process of information to the drum memory 22 and the toner memory 42 via the cartridge communication interface 71.

Figure 3:
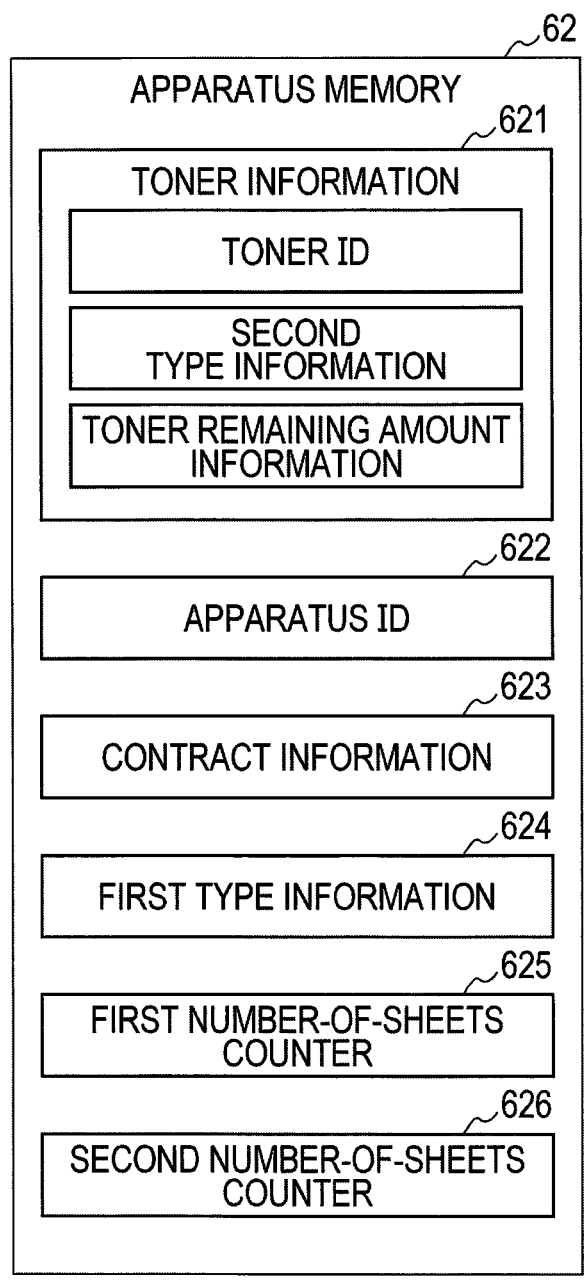
FIG. 3 is a block diagram showing an example of information stored in an apparatus memory.

The apparatus memory 62 is a memory from which information is read and to which information is written. The apparatus memory 62 is, for example, a flash ROM or an EEPROM. As shown in FIG. 3, the apparatus memory 62 has areas 621, 622, 623, 624, 625 and 626 for storing various information. The apparatus memory 62 stores toner information in the area 621.

The toner information is information relating to each toner cartridge 4 attached to the MFP 1. For example, the toner information may be data in which the toner ID read from a certain toner memory 42 is associated with the second type information and the toner remaining amount information read from the same toner memory 42. The apparatus memory 62 may store the data associated in this way in the area 621 for each toner cartridge 4.

The apparatus memory 62 stores the apparatus ID in the area 622. The apparatus ID is identification information for identifying the MFP 1. The apparatus ID may be, for example, a serial number of the MFP 1.

The apparatus memory 62 stores contract information in the area 623. The contract information is assumed to be one of two types of modes, "contract mode" and "normal mode". The "contract mode" indicates a state where a "consumable contract" for the MFP 1 is set. The "normal mode" indicates a state where the "consumable contract" for the MFP 1 is not set or the "consumable contract" has been cancelled. When the MFP 1 is shipped from the factory, a value corresponding to the "normal mode" is stored in the area 623 as an initial value. The controller 61 rewrites the "contract information" as appropriate.

The apparatus memory 62 stores first type information in the area 624. The first type information is information indicating the type of the MFP 1. In the present embodiment, there are two types of the MFP 1. One is a "contract-dedicated apparatus" as an example of a contract-dedicated apparatus that is usable when the "apparatus contract" is set. The other is a "normal apparatus" as an example of a normal apparatus that is not under the "apparatus contract" or is usable regardless of whether the "apparatus contract" is set.

The controller 61 rewrites the first type information as appropriate. When the MFP 1 is shipped from the factory, a value corresponding to "normal apparatus" is stored as an initial value in the area 624. The first type information may be included in the apparatus ID. That is, the apparatus ID may include information for identifying each MFP 1 and information indicating the type of each MFP 1.

The apparatus memory 62 stores a first number-of-sheets counter in the area 625. The first number-of-sheets counter is a cumulative total of the number of printed sheets in the MFP 1. The apparatus memory 62 stores a second number-of-sheets counter in the area 626. The second number-of-sheets counter indicates the number of sheets of the printed matter printed by the MFP 1 in the contract printing. The second number-of-sheets counter may be reset to 0 each time the MFP 1 shifts from the contract mode to the normal mode, or may be the cumulative total of printed sheets printed by the MFP 1 based on the contract. Hereinafter, unless otherwise specified, the value of the second number-of-sheets counter is the cumulative total of the number of printed sheets printed in the contract printing.

The apparatus memory 62 stores "mode information" indicating a contract state of the MFP 1. Here, as the "mode information" indicating the contract state of the MFP 1, one of the following four modes is stored in the apparatus memory 62.

(1) "First contract mode" in which the "apparatus contract" and the "consumable contract" are set;

(2) "Second contract mode" in which the "consumable contract" is set and the "apparatus contract" is not set;
(3) "Commercial mode" in which neither the "apparatus contract" nor the "consumable contract" is set; and
(4) "Function stop mode" in which the "apparatus contract" is cancelled and the apparatus main body 10 is to be returned to the business operator.

As shown in FIG. 1, the communication interface 63 is a wired interface or a wireless interface for communicating with the user terminal 9 and the server 8, and is connected to the network NT. The communication interface 63 is also connected to a telephone network. The controller 61 receives various data, notifications, and requests from the server 8 and so on via the communication interface 63. The controller 61 transmits various data, notifications, and requests to the server 8 via the communication interface 63.

The display 64 is, for example, a liquid crystal display. The operation interface 65 is a device that receives an operation by a user. The user inputs various instructions to the MFP 1 by operating the operation interface 65. The operation interface 65 may be configured by a touch panel integrally arranged on the screen of the display 64.

The print engine 66 takes out and conveys a sheet in a sheet feeding tray by a conveyance mechanism (not shown). The print engine 66 prints an image on the conveyed sheet by a laser printer method using the drum cartridge 20 and the toner cartridge 4. Thus, the MFP 1 has a printing function that uses the print engine 66. The toner cartridges 4 include the toner cartridges 4 for cyan, magenta, yellow, and black. However, hereinafter, unless otherwise specified, they are simply referred to as "toner cartridges 4" without being distinguished from one another.

The scanner unit 67 optically reads a document which is a reading target by using a photoelectric conversion element such as a CCD or a CMOS. Thereafter, the MFP 1 generates scan data representing the image read by the scanner unit 67. Thus, the MFP 1 has a scanner function that uses the scanner unit 67.

The facsimile and telephone communication interface 68 is connected to the telephone network via the communication interface 63. The facsimile and telephone communication interface 68 transmits and receives image data as a facsimile signal to and from an external communication destination apparatus, and performs voice communication with a desired call destination. Thus, the MFP 1 has a facsimile transmission function and a facsimile reception function.

[Contract Cancellation Reception Process]

Figure 4:
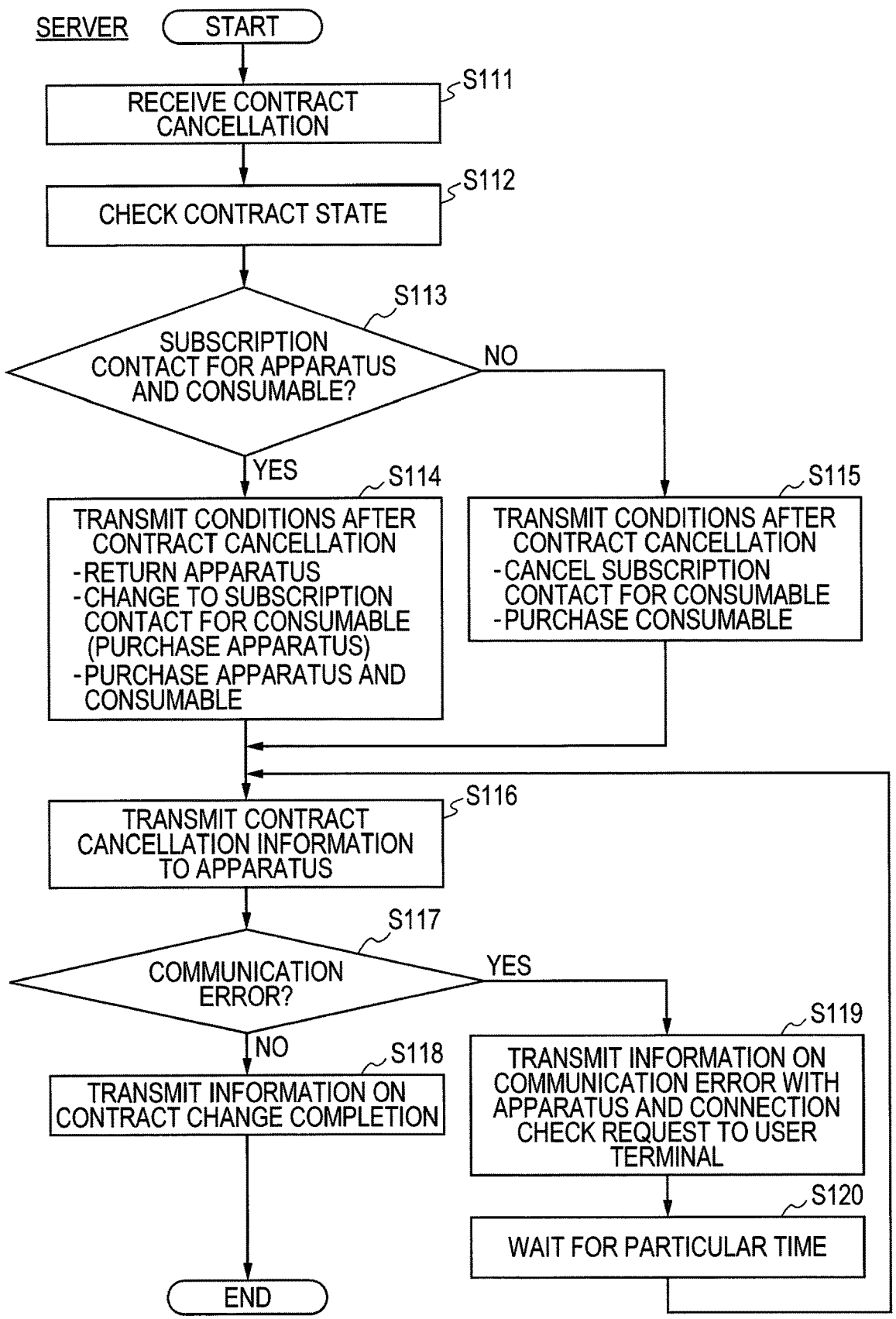
FIG. 4 is a flowchart showing an example of a contract cancellation reception process executed by a server controller of a server.

Next, a contract cancellation reception process of receiving contract cancellation of the MFP 1 and cancelling the contract will be described with reference to FIG. 4. FIG. 4 is a flowchart showing an example of the contract cancellation reception process performed by the server controller 81 of the server 8. The program shown in the flowchart in FIG. 4 is stored in the server memory 82 in advance. In response to receiving a request of contract cancellation from the user terminal 9, the server controller 81 starts the program of the contract cancellation reception process and proceeds to S111.

As shown in FIG. 4, in S111, the server controller 81 receives contract cancellation request information for requesting contract cancellation from the user terminal 9 via the communication interface 83. The server controller 81 reads a user name, a user ID for identifying a user, a terminal ID for identifying the user terminal 9, and an apparatus ID for identifying the MFP 1 specified as the target of the contract cancellation that are included in the contract cancellation request information, and stores the same in the server memory 82. Thereafter, the server controller 81 proceeds to processing of S112.

In S112, the server controller 81 reads the apparatus ID stored in association with the user name and the user ID included in the contract cancellation request information, from the registration table stored in the server memory 82. Then, the server controller 81 determines whether the apparatus ID read from the registration table matches the apparatus ID of the MFP 1 included in the contract cancellation request information.

When the apparatus ID read from the registration table and the apparatus ID of the MFP 1 included in the contract cancellation request information are different from each other, the server controller 81 determines that the MFP 1 is not the contract target apparatus, and ends the contract cancellation reception process.

When the apparatus ID read from the registration table matches the apparatus ID of the MFP 1 included in the contract cancellation request information, the server controller 81 determines that the MFP 1 is the contract target apparatus. The server controller 81 reads, from the registration table stored in the server memory 82, data representing whether each of "apparatus contract" and "consumable contract" associated with the apparatus ID of the MFP 1 included in the contract cancellation request information is in a contract state. Thereafter, the server controller 81 proceeds to processing of S113.

In S113, the server controller 81 determines whether both "apparatus contract" and "consumable contract" are in a contract state (first contract mode) with respect to the MFP 1 for which the contract cancellation request has been made. That is, the server controller 81 determines whether a subscription contract for both the MFP 1 which is an apparatus and the toner cartridge 4 which is a consumable is set.

In response to determining that both "apparatus contract" and "consumable contract" are in a contract state (first contract mode) with respect to the MFP 1 for which the contract cancellation request has been made (S113: YES), the server controller 81 proceeds to processing of S114. In S114, the server controller 81 transmits conditions (hereinafter, also referred to as "first condition") available for the user after contract cancellation of both "apparatus contract" and "consumable contract" to the user terminal 9 via the communication interface 83. Thus, the user easily selects the first condition after contract cancellation.

For example, the server controller 81 transmits the following to the user terminal 9 via the communication interface 83.

(1-1) Cancelling both "apparatus contract" and "consumable contract" and returning the MFP 1 to the business operator (returning apparatus)
(1-2) Purchasing the MFP 1 (purchasing apparatus) and setting "consumable contract" (second contract mode)
(1-3) Cancelling both "apparatus contract" and "consumable contract" and purchasing both the MFP 1 and the contract-dedicated cartridge (commercial mode)

In response to receiving a notification including the first condition received by the user terminal 9, the user transmits information including the selected first condition to the server controller 81 via the input interface of the user terminal 9. Thereafter, the server controller 81 receives the first condition selected by the user, from the user terminal 9 via the communication interface 83, and stores the received first condition in the server memory 82.

According to the selection content of the received first condition, the server controller 81 updates data indicating whether each of "apparatus contract" and "consumable contract" is in a contract state, the data being associated with the apparatus ID of the MFP 1 in the registration table stored in the server memory 82. The server controller 81 changes the "first contract mode" that is the contract mode stored in the server memory 82 in association with the apparatus ID of the MFP 1 to the selected first condition among "second contract mode", "commercial mode", and "returning apparatus", for example. Thereafter, the server controller 81 proceeds to processing of S116 described later.

In S113, in response to determining that only "consumable contract" is in a contract state (second contract mode) with respect to the MFP 1 for which the contract cancellation request has been made (S113: NO), the server controller 81 proceeds to processing of S115. In S115, the server controller 81 transmits conditions (hereinafter, also referred to as "second condition") available for the user after contract cancellation of the "consumable contract" to the user terminal 9 via the communication interface 83. Thus, the user easily selects the second condition after the contract cancellation.

For example, the server controller 81 transmits the following to the user terminal 9 via the communication interface 83.

(2-1) Cancelling "consumable contract" to cancel consumable subscription contract, and returning the contract-dedicated cartridge to the business operator (commercial mode, returning consumable)

(2-2) Cancelling "consumable contract" to cancel consumable subscription contract, and purchasing the contract-dedicated cartridge (commercial mode, purchasing consumable)

In response to receiving a notification including the second condition received by the user terminal 9, the user transmits information including the selected second condition to the server controller 81 via the input interface of the user terminal 9. Thereafter, the server controller 81 receives the second condition selected by the user from the user terminal 9 via the communication interface 83 and stores the received second condition in the server memory 82.

According to the selection content of the received second condition, the server controller 81 updates data indicating whether each of "apparatus contract" and "consumable contract" is in a contract state, the data being associated with the apparatus ID of the MFP 1 in the registration table stored in the server memory 82. The server controller 81 changes the "second contract mode" that is contract mode stored in the server memory 82 in association with the apparatus ID of the MFP 1 to the selected second condition among "commercial mode, returning consumable" and "commercial mode, purchasing consumable", for example. Thereafter, the server controller 81 proceeds to processing of S116.

In S116, the server controller 81 reads, from the server memory 82, the first condition selected by the user in S114 or reads the second condition selected by the user in S115. The server controller 81 transmits, as the contract cancellation information, the first condition or the second condition read from the server memory 82 to the MFP 1 corresponding to the apparatus ID included in the contract cancellation request information received in S111 via the communication interface 83. Thereafter, the server controller 81 proceeds to processing of S117.

For example, when the user selects the first condition, the server controller 81 transmits, to the MFP 1, information corresponding to the first condition selected by the user among (1-1) returning apparatus, (1-2) purchasing apparatus, second contract mode, and (1-3) commercial mode, as the contract cancellation information. When the user selects the second condition, the server controller 81 transmits, to the MFP 1, information corresponding to the second condition selected by the user among (2-1) commercial mode, returning consumable and (2-2) commercial mode, purchasing consumable, as the contract cancellation information.

In S117, the server controller 81 determines whether a communication error occurs in transmission to the MFP 1. In response to determining that there is no communication error occurring in the transmission to the MFP 1 (S117: NO), the server controller 81 proceeds to processing of S118. In S118, the server controller 81 transmits contract completion information indicating that the contract cancellation of the MFP 1 is completed to the user terminal 9 via the communication interface 83, and then ends the contract cancellation reception process.

In response to determining that a communication error occurs in transmission to the MFP 1 (S117: YES), the server controller 81 proceeds to processing of S119. In S119, the server controller 81 reads the terminal ID included in the contract cancellation request information received in S111 from the server memory 82.

The server controller 81 transmits error information indicating that a communication error occurs in the transmission to the MFP 1 (apparatus), to the user terminal 9 corresponding to the read terminal ID via the communication interface 83. The server controller 81 transmits, via the communication interface 83, connection check request information for requesting connection check of the MFP 1 to the network NT, to the user terminal 9 corresponding to the read terminal ID. Thereafter, the server controller 81 proceeds to processing of S120. In S120, the server controller 81 waits for a particular time, for example, about 30 minutes to about an hour, and then performs processing of S116 and thereafter again.

[Contract Mode Change Process]

Next, a flow of a contract mode change process of changing mode information stored in the apparatus memory 62 of the MFP 1 based on a change in a contract state will be described with reference to FIGS. 5 to 7. Here, a case where "apparatus contract" and "consumable contract" have been set at the time of shipping of the MFP 1 from a factory or at the time of shipping from a sales company will be described.

Figure 5:
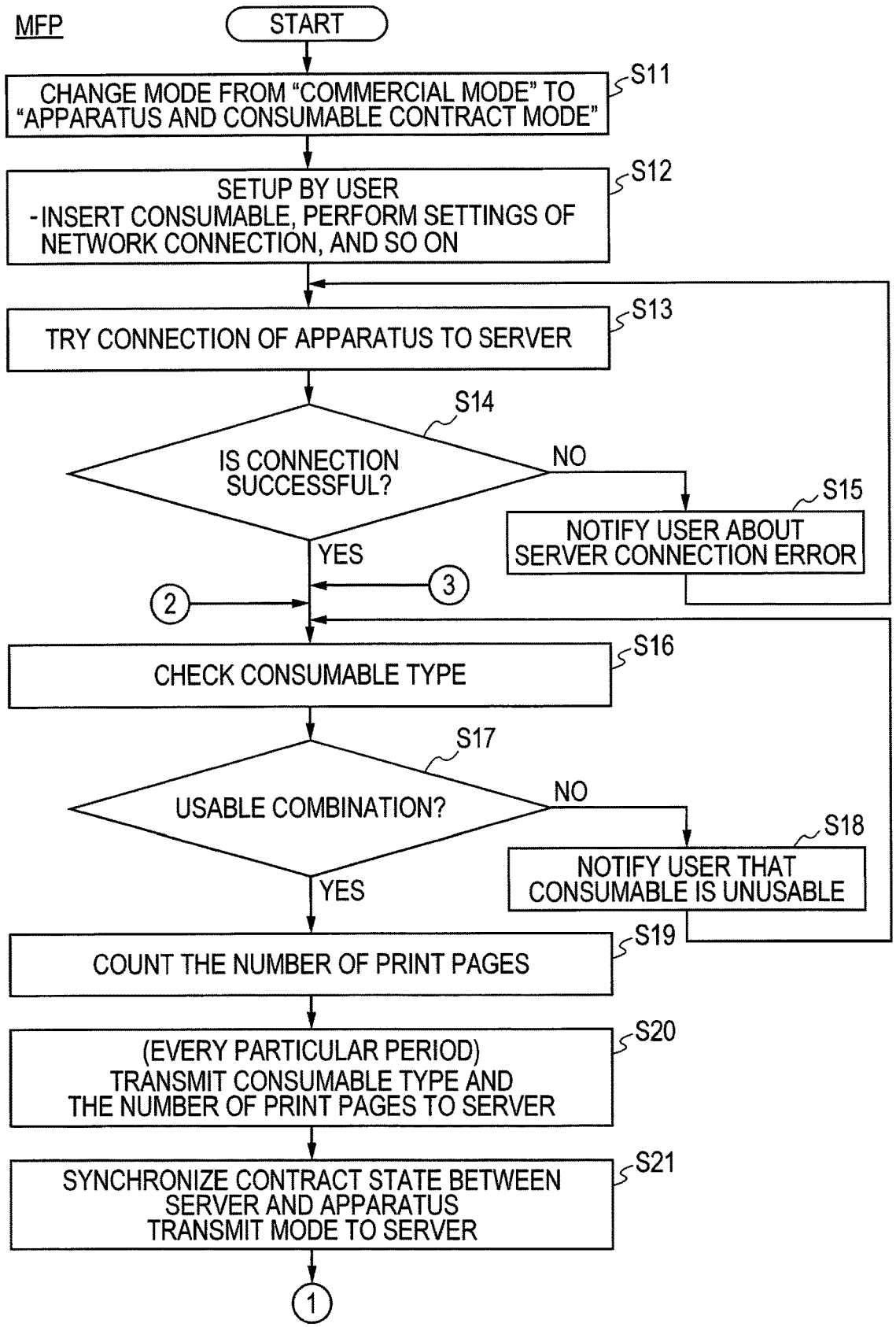
FIG. 5 is a part of a flowchart showing an example of a contract mode change process executed by a controller of a multifunction peripheral (MFP).
Figure 6:
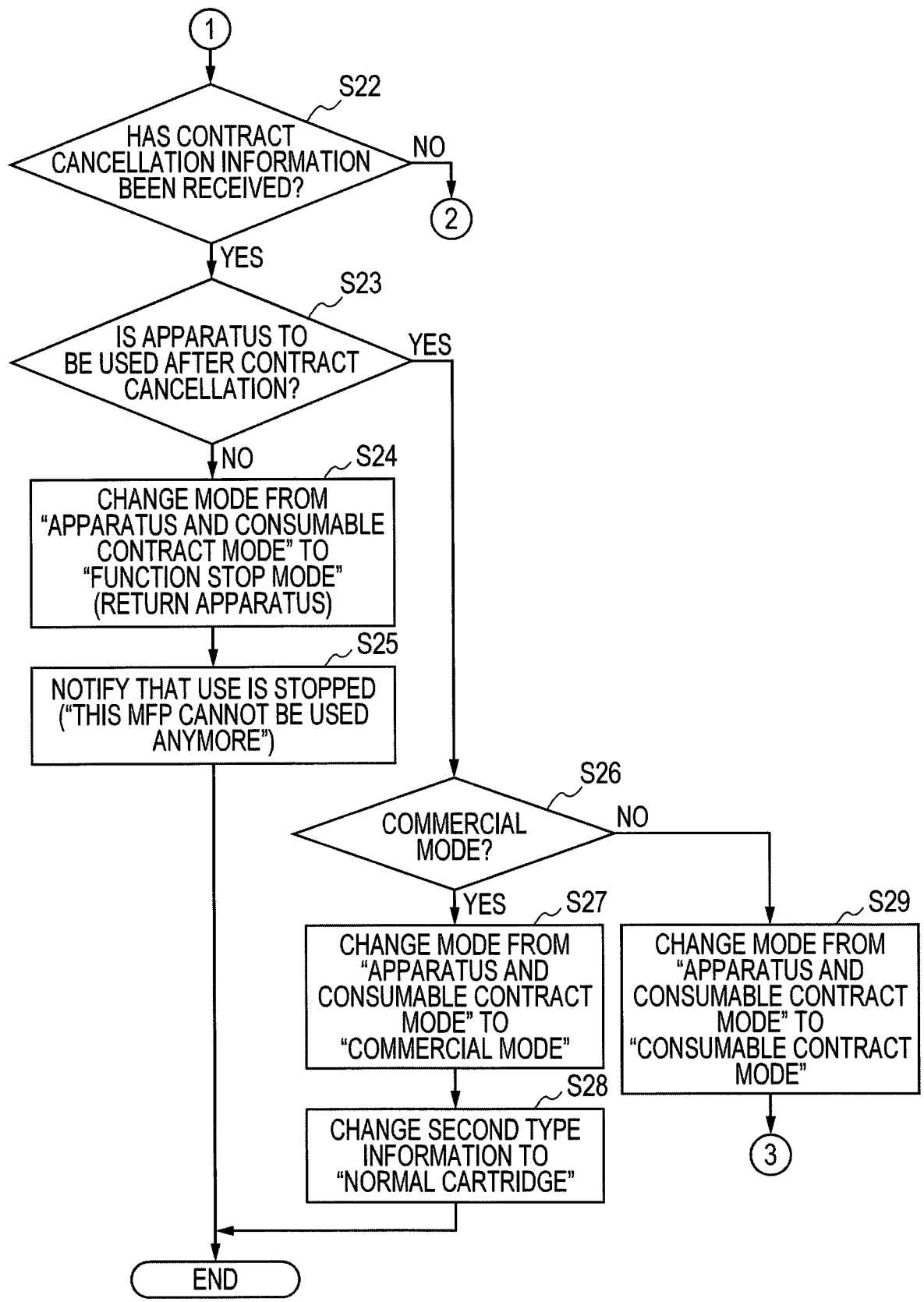
FIG. 6 is another part of the flowchart showing the example of the contract mode change process executed by the controller of the MFP.

FIGS. 5 and 6 are flowcharts showing an example of the flow of the contract mode change process executed by the controller 61 of the MFP 1. FIG. 7 is a table for explaining an example of combinations of contract modes of the MFP 1 and usable consumable. The table shown in FIG. 7 is stored in the apparatus memory 62 in advance. When the controller 61 is activated, the controller 61 proceeds to processing of S11 of the contract mode change process.

When the MFP 1 is manufactured in the factory, the "commercial mode" in which neither the "apparatus contract" nor the "consumable contract" is set is stored in the apparatus memory 62. Accordingly, the "normal mode" is stored in the contract information of the area 623 of the apparatus memory 62. The "normal apparatus" is stored in the first type information of the area 624 of the apparatus memory 62.

As shown in FIG. 5, in S11, the controller 61 of the MFP 1 stores, in place of the "commercial mode", the "first contract mode" that is the contract mode of the apparatus main body and the consumable in the apparatus memory 62 as the "mode information" at the time of shipment from the factory, for example. The controller 61 stores the "contract mode" in the contract information of the area 623 of the apparatus memory 62. The controller 61 stores "contract-dedicated apparatus" in the first type information of the area 624 of the apparatus memory 62. Thereafter, the controller 61 proceeds to processing of S12.

In S12, the setup of the MFP 1 is performed by the user. The setup includes, for example, attaching the toner cartridge 4 of each color. The communication interface 63 is connected to the network NT via a communication cable by the user. A power supply plug (not shown) is connected to a power source, so that power supply to the MFP 1 starts. Thereafter, the controller 61 proceeds to processing of S13.

In S13, the controller 61 transmits, via the communication interface 63, a test communication message to the server 8 connected to the network NT, and then proceeds to processing of S14. In S14, the controller 61 determines whether a response message has been received from the server 8 via the communication interface 63. That is, the controller 61 determines whether connection to the server 8 via the communication interface 63 has been established.

In response to determining that a response message has not been received from the server 8, that is, connection to the server 8 via the communication interface 63 has not been established (S14: NO), the controller 61 proceeds to processing of S15. In S15, the controller 61 controls the display 64 to display a screen that a communication connection error to the server 8 has occurred, thereby notifying the user. Thereafter, the controller 61 performs processing of S13 and thereafter again.

In response to determining that a response message has been received, that is, connection to the server 8 via the communication interface 63 has been established (S14: YES), the controller 61 proceeds to processing of S16. In S16, the controller 61 detects the type of each toner cartridge 4 attached to the apparatus main body 10. Specifically, the controller 61 reads the second type information of the second area 422 of each toner memory 42 via the cartridge communication interface 71, and stores the second type information in the area 621 of the apparatus memory 62. Thereafter, the controller 61 proceeds to processing of S17.

In S17, the controller 61 reads the "first contract mode" as the "mode information" from the apparatus memory 62. The controller 61 reads the table shown in FIG. 7 from the apparatus memory 62. The controller 61 determines whether each of the normal cartridge (commercial consumable) and the contract-dedicated cartridge (contract consumable) corresponding to the "first contract mode", that is, "apparatus and consumable contract mode" is usable or unusable.

Here, in the table shown in FIG. 7, information indicating that the normal cartridge (commercial consumable) is "usable" and the contract-dedicated cartridge (contract consumable) is "unusable" is stored for the "commercial mode" as the mode information. Information indicating that the normal cartridge is "unusable" and the contract-dedicated cartridge is "usable" is stored for the "first contract mode", that is, the "apparatus and consumable contract mode". Information indicating that the normal cartridge is "usable (not charged)" and the contract-dedicated cartridge is "usable" is stored for the "second contract mode", that is, the "consumable contract mode".

Here, since the controller 61 has read the "first contract mode" as the "mode information" from the apparatus memory 62, the controller 61 determines that the normal cartridge is "unusable", that is, use is prohibited, and the contract-dedicated cartridge is "usable". Subsequently, the controller 61 reads the second type information of each toner cartridge 4 stored in the area 621 of the apparatus memory 62 in S16, and determines whether all the toner cartridges 4 attached to the apparatus main body 10 are the combination of the contract-dedicated cartridge. That is, the controller 61 determines whether each toner cartridge 4 attached to the apparatus main body 10 is the usable combination.

In response to determining that not all of the toner cartridges 4 attached to the apparatus main body 10 is the combination of the contract-dedicated cartridge (S17: NO), the controller 61 proceeds to processing of S18. In S18, the controller 61 controls the display 64 to display a screen that the toner cartridge 4 attached to the apparatus main body 10 is not the usable contract-dedicated cartridge combination, thereby notifying the user. Thereafter, the controller 61 performs processing of S16 and thereafter again.

In response to determining that all of the toner cartridges 4 attached to the apparatus main body 10 are the contract-dedicated cartridge combination (S17: YES), the controller 61 proceeds to processing of S19. In S19, the controller 61 counts the number of print sheets of a print job. The controller 61 adds the number of print sheets of the print job to the first number-of-sheets counter stored in the area 625 of the apparatus memory 62 and updates the cumulative number of print sheets. Since the mode is the "first contract mode", the controller 61 adds the number of print sheets of the print job to the second number-of-sheets counter stored in the area 626 of the apparatus memory 62 and updates the cumulative number of sheets of the contract printing. Thereafter, the controller 61 proceeds to processing of S20.

In S20, every particular period, for example, every several hours or every 24 hours, the controller 61 reads the second type information of each cartridge stored in the area 621 of the apparatus memory 62 and the count value of the cumulative number of sheets stored in each area 625, 626. The controller 61 transmits the second type information of each cartridge stored in the area 621 of the apparatus memory 62 and the count value of the cumulative number of sheets stored in each area 625, 626, together with the apparatus ID stored in the area 622, to the server 8 via the communication interface 63. Thereafter, the controller 61 proceeds to processing of S21.

In S21, the controller 61 reads the "first contract mode" as the mode information from the apparatus memory 62 and transmits the "first contract mode", together with the "apparatus ID" stored in the area 622, to the server 8 via the communication interface 63. Thereafter, the controller 61 proceeds to processing of S22.

In response to receiving the "first contract mode" as the mode information and the "apparatus ID" from the MFP 1, the server controller 81 of the server 8 stores the information in the server memory 82. Since the received mode information is the "first contract mode", the server controller 81 updates "apparatus contract" and "consumable contract" corresponding to the received apparatus ID with data indicating under contract in the registration table stored in the area 822, thereby synchronizing the mode information.

As shown in FIG. 6, in S22, the controller 61 determines whether "contract cancellation information" regarding "apparatus contract" and "consumable contract" has been received from the server 8 via the communication interface 63. In response to determining that the "contract cancellation information" regarding "apparatus contract" and "consumable contract" has not been received from the server 8 (S22: NO), the controller 61 performs processing of S16 and thereafter.

In response to determining that the "contract cancellation information" regarding "apparatus contract" and "consumable contract" has been received from the server 8 via the communication interface 63 (S22: YES), the controller 61 proceeds to processing of S23. In S23, the controller 61 determines whether the "contract cancellation information" indicates (1-1) cancelling both "apparatus contract" and "consumable contract" and returning the MFP 1 to the business operator (returning apparatus). That is, the controller 61 determines whether the MFP 1 (contract-dedicated apparatus) and the toner cartridge 4 (contract-dedicated consumable) are to be used after both "apparatus contract" and "consumable contract" are cancelled. That is, the controller 61 determines whether the MFP 1 is to be used (utilized) continuously after the contract cancellation.

In response to determining that the "contract cancellation information" indicates (1-1) cancelling both "apparatus contract" and "consumable contract" and returning the MFP 1 to the business operator (returning apparatus) (function-stop-mode cancellation information) (S23: NO), the controller 61 proceeds to processing of S24. In S24, the controller 61 reads the mode information from the apparatus memory 62. The controller 61 changes the mode information from (1) "first contract mode" in which "apparatus contract" and "consumable contract" are set to (4) "function stop mode" in which "apparatus contract" is cancelled and the apparatus main body 10 is returned to the business operator, and the stores the mode information in the apparatus memory 62 again.

The "function stop mode" is a mode in which a plurality of functions including the printing function, the scanner function, and the facsimile transmission and reception function are set to be unusable (disabled) for the user. Alternatively, the controller 61 may set some (part) of the printing function, the scanner function, and the facsimile transmission and reception function to be unusable for the user. However, the controller 61 sets the display 64 as the user interface and connection to the network NT via the communication interface 63 to be usable. Thereafter, the controller 61 proceeds to processing of S25.

Thus, in response to receiving, from the server 8, the "contract information" (function-stop-mode cancellation information) indicating cancellation of both "apparatus contract" and "consumable contract" and returning the MFP 1 (returning apparatus) to the business operator, the controller 61 stops the functions usable in the MFP 1. This resultantly prevents an unauthorized use of the MFP 1 after contract cancellation of both "apparatus contract" and "consumable contract" of the MFP 1. This allows the business operator to stop the functions usable in the MFP 1 and wait for return of the apparatus main body 10.

In S25, the controller 61 controls the display 64 to display that use of a plurality of functions including the printing function, the scanner function, and facsimile transmission and reception function by the user is stopped (prohibited). For example, the controller 61 controls the display 64 to display "This MFP cannot be used anymore" and notifies that the use of the MFP 1 is stopped. Thereafter, the controller 61 ends the contract mode change process. Thus, the user easily recognizes via the display 64 that the use of the plurality of functions including the printing function, the scanner function, and the facsimile transmission and reception function of the MFP 1 is stopped.

In S23 described above, in response to determining that the "contract cancellation information" does not indicate (1-1) cancelling both "apparatus contract" and "consumable contract" and returning the MFP 1 to the business operator (returning apparatus) (S23: YES), the controller 61 proceeds to processing of S26. In S26, the controller 61 determines whether the "contract cancellation information" indicates (1-3) cancelling both "apparatus contract" and "consumable contract" and purchasing both the MFP 1 and the contract-dedicated cartridge (commercial mode) (first cancellation information).

In response to determining that the "contract cancellation information" indicates (1-3) cancelling both "apparatus contract" and "consumable contract" and purchasing both the MFP 1 and the contract-dedicated cartridge (commercial mode) (S26: YES), the controller 61 proceeds to processing of S27. In S27, the controller 61 reads the mode information from the apparatus memory 62. The controller 61 changes the mode information from (1) "first contract mode" in which "apparatus contract" and "consumable contract" are set to (3) "commercial mode" in which neither "apparatus contract" nor "consumable contract" is set, and stores the mode information in the apparatus memory 62 again. Thereafter, the controller 61 proceeds to processing of S28.

In S28, the controller 61 rewrites the "contract-dedicated cartridge" stored in the second area 422 of the toner memory 42 of each toner cartridge 4 to the "normal cartridge" via the cartridge communication interface 71. The controller 61 rewrites the second type information of each toner cartridge 4 stored in the area 621 of the apparatus memory 62 from the "contract-dedicated cartridge" to the "normal cartridge". The controller 61 rewrites the contract information of the area 623 of the apparatus memory 62 from the "contract mode" to the "normal mode". The controller 61 rewrites the first type information of the area 624 from the "contract-dedicated apparatus" to the "normal apparatus". Thereafter, the controller 61 ends the contract mode change process.

Thus, the user does not have to pay periodically and the printing costs are reduced. The user purchases the MFP 1 from the business operator at the time of expiration of the contract period of the "apparatus contract" for the MFP 1 and continuously uses the MFP 1.

In S26 described above, in response to determining that the "contract cancellation information" does not indicate (1-3) cancelling both "apparatus contract" and "consumable contract" and purchasing both the MFP 1 and the contract-dedicated cartridge (commercial mode) (S26: NO), the controller 61 proceeds to processing of S29. That is, in response to determining that the "contract cancellation information" indicates (1-2) purchasing the MFP 1 (purchasing apparatus) and setting only "consumable contract" (second contract mode) (S26: NO), the controller 61 proceeds to processing of S29.

In S29, the controller 61 reads the mode information from the apparatus memory 62. The controller 61 changes the mode information from (1) the "first contract mode" in which "apparatus contract" and "consumable contract" are set to (2) the "second contract mode" in which only "consumable contract" is set, and stores the mode information in the apparatus memory 62 again. The controller 61 rewrites the first type information of the area 624 of the apparatus memory 62 from the "contract-dedicated apparatus" to the "normal apparatus". Thereafter, the controller 61 performs processing of S16 and thereafter again. Thus, the user needs to pay just the contract fee of the "consumable contract" without paying the contract fee of the "apparatus contract", so that periodic costs are reduced.

Thereafter, the controller 61 performs processing of S16 to S22. In S22, in response to determining that the "contract cancellation information" regarding the "consumable contract" has not been received from the server 8 via the communication interface 63 (S22: NO), the controller 61 performs processing of S16 and thereafter again.

In response to determining that the "contract cancellation information" regarding the "consumable contract" has been received from the server 8 via the communication interface 63 (S22: YES), the controller 61 proceeds to processing of S23. In S23, the controller 61 reads the first type information of the apparatus memory 62, and, since the first type information indicates the "normal apparatus", the controller 61 determines that the MFP 1 is continuously used (utilized) (S23: YES), and proceeds to processing of S26.

In S26, the controller 61 determines whether the "contract cancellation information" indicates (2-2) cancelling "consumable contract" and purchasing the contract-dedicated cartridge (commercial mode, purchasing consumable). In response to determining that the "contract cancellation information" indicates (2-2) cancelling "consumable contract" and purchasing the contract-dedicated cartridge (commercial mode, purchasing consumable) (S26: YES), the controller 61 proceeds to processing of S27. Thus, in this case, S26 in FIG. 6 should be read as "PURCHASE CONSUMABLE?".

In S27, the controller 61 reads the mode information from the apparatus memory 62. The controller 61 changes the mode information from (2) the "second contract mode" in which only the "consumable contract" is set to (3) the "commercial mode" in which neither the "apparatus contract" nor the "consumable contract" is set, and stores the mode information in the apparatus memory 62 again. Thus, in this case, S27 in FIG. 6 should be read as "CHANGE MODE FROM "CONSUMABLE CONTRACT MODE" TO "COMMERCIAL MODE, PURCHASE CONSUMABLE". Thereafter, the controller 61 proceeds to processing of S28.

In S28, the controller 61 rewrites the "contract-dedicated cartridge" stored in the second area 422 of the toner memory 42 of each toner cartridge 4 to the "normal cartridge" via the cartridge communication interface 71. The controller 61 rewrites the second type information of each toner cartridge 4 stored in the area 621 of the apparatus memory 62 from the "contract-dedicated cartridge" to the "normal cartridge". The controller 61 rewrites the contract information of the area 623 of the apparatus memory 62 from the "contract mode" to the "normal mode". Thereafter, the controller 61 ends the contract mode change process. Thus, the user does not have to pay periodically and printing costs are reduced.

In S26, in response to determining that the "contract cancellation information" does not indicate (2-2) cancelling "consumable contract" and purchasing the contract-dedicated cartridge (commercial mode, purchasing consumable) (S26: NO), the controller 61 proceeds to processing of S29. That is, in response to determining that the "contract cancellation information" indicates (2-1) cancelling "consumable contract" and returning the contract-dedicated cartridge to the business operator (commercial mode, returning consumable) (S26: NO), the controller 61 proceeds to processing of S29.

In S29, the controller 61 reads the mode information from the apparatus memory 62. The controller 61 changes the mode information from the "second contract mode" in which only the "consumable contract" is set to the "commercial mode" in which neither the "apparatus contract" nor the "consumable contract" is set, and stores the mode information in the apparatus memory 62 again. The controller 61 rewrites the contract information of the area 623 of the apparatus memory 62 from the "contract mode" to the "normal mode". The controller 61 controls the display 64 to display that the toner cartridge 4 needs to be returned to the business operator, and then performs the processing of S16 and thereafter again. Thus, in this case, S29 in FIG. 6 should be read as "CHANGE MODE FROM "CONSUMABLE CONTRACT MODE" TO "COMMERCIAL MODE, RETURN CONSUMABLE". Thus, the user does not have to pay periodically and printing costs are reduced.

[Modification 1]

The image forming apparatus of the present disclosure is not limited to the MFP 1. The image forming apparatus may be an apparatus dedicated to a printing function, such as a laser printer and an inkjet printer, for example.

[Modification 2]

The drum cartridge 20 may include a photosensitive drum, a cartridge housing, the drum memory 22, a charger, and a development roller. The cartridge housing is provided with the photosensitive drum, the drum memory 22, the charger, and the development roller. The toner cartridge 4 includes a cartridge housing and the toner memory 42, but does not include a development roller. The cartridge housing contains toner. The outer circumferential surface of the development roller is in contact with the outer circumferential surface of the photosensitive drum inside the drum cartridge 20.

[Modification 3]

The toner cartridge 4 may be constituted by two cartridges (not shown). A first cartridge of the two cartridges constituting the toner cartridge 4 includes a development roller. A second cartridge of the two cartridges constituting the toner cartridge 4 includes a cartridge housing and the toner memory 42. The cartridge housing contains toner.

[Modification 4]

The MFP 1 may include a single cartridge (not shown) instead of the drum cartridge 20 and the toner cartridge 4. The single cartridge includes a photosensitive drum, a cartridge housing, a memory, a charger, and a development roller. The outer circumferential surface of the development roller is in contact with the outer circumferential surface of the photosensitive drum inside the single cartridge. The cartridge housing of the single cartridge contains toner.

[Modification 5]

In the MFP 1, the drum cartridge 20 and the toner cartridge 4 may be independently attachable to and detachable from the apparatus main body 10.

[Modification 6]

The print engine 66 of the MFP 1 may be an inkjet printer. In a case where the print engine 66 is an inkjet printer, an ink cartridge is attached to the apparatus main body 10 of the MFP 1 instead of the drum cartridge 20 and the toner cartridge 4. The number of ink cartridges attached to the MFP 1 is not particularly limited. For example, the MFP 1 may be provided with a total of four ink cartridges corresponding to four colors of cyan, magenta, yellow, and black, respectively, or may be provided with one ink cartridge corresponding to black color.

The ink cartridge includes a built-in ink memory. The ink memory stores, for example, an ink ID, ink type information, an ink remaining amount, a new product flag, and order information. The ink ID is information similar to the toner ID. The ink type information is information similar to the second type information.

In a case where the print engine 66 is an inkjet printer, the flow of the process of FIGS. 4 and 5 is similar. Specifically, in a case where the print engine 66 is an inkjet printer, the "toner cartridge 4" and the "toner memory 42" in the description of the above-described embodiment may be replaced with an ink cartridge and an ink memory, respectively. Further, the "toner ID", the "second type information", and the "toner remaining amount information" may be replaced with the ink ID, the ink type information, and the ink remaining amount information, respectively. In a case where the print engine 66 is an inkjet printer, the effects similar to those of the MFP 1 of the embodiment are obtained.

[Example of Implementation by Software]

The functions of the MFP 1 (hereinafter referred to as "apparatus") may be implemented by a program for causing a computer to function as the MFP 1, that is, the program for causing the computer to function as the controller 61 of the MFP 1.

In this case, the MFP 1 includes a computer including at least one control device (for example, a processor) and at least one storage device (for example, a memory) as hardware for executing the program. Each function described in the above embodiment is realized by executing the program by the control device and the storage device.

The program may be recorded in one or more non-transitory computer-readable storage medium. This storage medium may be included in the MFP 1 or may not be included in the MFP 1. In the latter case, the program may be supplied to the MFP 1 via any wired or wireless transmission medium.

A part or all of the functions of the controller 61 may be realized by a logic circuit. For example, an integrated circuit in which a logic circuit functioning as each of the above-described control blocks is formed is also included in the scope of the present disclosure.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided as appropriate.

What is claimed is:

1. An image forming apparatus comprising:
   an apparatus main body;
   a consumable attachable to the apparatus main body;
   a communication interface configured to communicate with a server;
   an apparatus memory configured to store mode information indicating one of a first contract mode, a second contract mode, and a commercial mode, the first contract mode being a mode in which an apparatus contract for the apparatus main body and a consumable contract for the consumable are set, the second contract mode being a mode in which the apparatus contract is not set and the consumable contract is set, the commercial mode being a mode in which neither the apparatus contract nor the consumable contract is set; and
   a controller configured to perform:
      receiving first cancellation information of the first contract mode from the server via the communication interface; and
      in response to receiving the first cancellation information of the first contract mode from the server, switching the mode information from the first contract mode to the second contract mode or the commercial mode.

2. The image forming apparatus according to claim 1, wherein the first cancellation information includes purchase information indicating purchase of the apparatus main body that is a target of the apparatus contract.

3. The image forming apparatus according to claim 1, wherein the controller is configured to:
   receive second cancellation information of the second contract mode from the server via the communication interface; and
   in response to receiving the second cancellation information of the second contract mode from the server, switch the mode information from the second contract mode to the commercial mode.

4. The image forming apparatus according to claim 1, wherein the mode information further includes a function stop mode of stopping a function of the image forming apparatus; and
   wherein the controller is configured to:
      receive function-stop-mode cancellation information different from the first cancellation information from the server via the communication interface; and
      in response to receiving the function-stop-mode cancellation information from the server, switch the mode information from the first contract mode to the function stop mode.

5. The image forming apparatus according to claim 4, wherein the function-stop-mode cancellation information includes return information indicating return of the apparatus main body that is a target of the apparatus contract.

6. The image forming apparatus according to claim 4, further comprising:
   at least a print engine or a scanner unit; and
   a user interface;
   wherein the controller is configured to:
      when switching the mode information from the first contract mode to the function stop mode,
      disable the at least the print engine or the scanner unit; and
      enable the user interface and output, via the user interface, a notification that use of the image forming apparatus is disabled.

7. The image forming apparatus according to claim 1, wherein the first cancellation information received from the server indicates one of the second contract mode, the commercial mode, and return of the apparatus main body, as a mode executable after cancellation of the first contract mode; and
   wherein the controller is configured to switch the mode information based on the first cancellation information received from the server.

8. A server comprising:
   a communication interface configured to communicate with a user terminal and an image forming apparatus;
   a server memory configured to store contract mode information in association with the image forming apparatus, the contract mode information indicating one of a first contract mode and a second contract mode, the first contract mode being a mode in which an apparatus contract and a consumable contract are set, the apparatus contract being a contract for an apparatus main body of the image forming apparatus, the consumable contract being a contract for a consumable attachable to the apparatus main body, the second contract mode being a mode in which the apparatus contract is not set and the consumable contract is set; and a server controller configured to perform:
receiving cancellation information of the first contract mode of the image forming apparatus from the user terminal via the communication interface;
in response to receiving the cancellation information of the first contract mode of the image forming apparatus from the user terminal, transmitting a first condition to the user terminal, the first condition including the second contract mode, a commercial mode, or return of the apparatus main body, the second contract mode being executable after cancellation of the first contract mode, the commercial mode being neither the first contract mode nor the second contract mode;
receiving selection of the first condition from the user terminal via the communication interface;
updating the contract mode information of the image forming apparatus with the received selection of the first condition; and
transmitting the updated contract mode information to the image forming apparatus via the communication interface.

9. The server according to claim 8, wherein the server controller is configured to:
receive cancellation information of the second contract mode of the image forming apparatus from the user terminal via the communication interface;
in response to receiving the cancellation information of the second contract mode of the image forming apparatus from the user terminal, transmit a second condition to the user terminal, the second condition including a commercial mode or purchase of the consumable, the commercial mode being executable after cancellation of the second contract mode;
receive selection of the second condition from the user terminal via the communication interface;
update the contract mode information of the image forming apparatus with the received selection of the second condition; and
transmit the updated contract mode information to the image forming apparatus via the communication interface.

10. A system comprising:
an image forming apparatus;
a server configured to communicate with the image forming apparatus; and
a user terminal configured to communicate with the server,
the image forming apparatus comprising an apparatus main body, a consumable attachable to the apparatus main body, an apparatus communication interface, an apparatus memory, and an apparatus controller,
the server comprising:
a server communication interface;
a server memory configured to store contract mode information in association with the image forming apparatus, the contract mode information indicating one of a first contract mode and a second contract mode, the first contract mode being a mode in which an apparatus contract and a consumable contract are set, the apparatus contract being a contract for the apparatus main body of the image forming apparatus, the consumable contract being a contract for the consumable, the second contract mode being a mode in which the apparatus contract is not set and the consumable contract is set; and a server controller configured to perform;
receiving cancellation information of the first contract mode of the image forming apparatus from the user terminal via the server communication interface;
in response to receiving the cancellation information of the first contract mode of the image forming apparatus from the user terminal, transmitting a first condition to the user terminal, the first condition including the second contract mode, a commercial mode, or return of the apparatus main body, the second contract mode being executable after cancellation of the first contract mode, the commercial mode being neither the first contract mode nor the second contract mode;
receiving selection of the first condition from the user terminal via the server communication interface;
updating the contract mode information of the image forming apparatus with the received selection of the first condition; and
transmitting the updated contract mode information to the image forming apparatus via the server communication interface.

11. The system according to claim 10, wherein the server controller is configured to:
receive cancellation information of the second contract mode of the image forming apparatus from the user terminal via the server communication interface;
in response to receiving the cancellation information of the second contract mode of the image forming apparatus from the user terminal, transmit a second condition to the user terminal via the server communication interface, the second condition including the commercial mode or purchase of the consumable, the commercial mode being executable after cancellation of the second contract mode;
receive selection of the second condition from the user terminal via the server communication interface;
update the contract mode information of the image forming apparatus with the received selection of the second condition; and
transmit the updated contract mode information to the image forming apparatus via the server communication interface.

12. The system according to claim 10, wherein the apparatus memory is configured to store mode information indicating one of the first contract mode, the second contract mode, and the commercial mode; and
wherein the apparatus controller is configured to:
receive, as the updated contract mode information, first cancellation information of the first contract mode from the server via the apparatus communication interface; and
in response to receiving the first cancellation information of the first contract mode from the server, switch the mode information from the first contract mode to the second contract mode or the commercial mode.

13. The system according to claim 12, wherein the first cancellation information includes purchase information indicating purchase of the apparatus main body that is a target of the apparatus contract.

14. The system according to claim 12, wherein the apparatus controller is configured to:

receive second cancellation information of the second contract mode from the server via the apparatus communication interface; and in response to receiving the second cancellation information of the second contract mode from the server, switch the mode information from the second contract mode to the commercial mode.

15. The system according to claim 10, wherein the user terminal comprises a user terminal controller and an input interface configured to receive input from a user; and wherein the user terminal controller is configured to:
receive the first condition from the server;
in response to receiving the first condition from the server, receive selection of the first condition via the input interface; and
in response to receiving the selection of the first condition via the input interface, transmit the received selection to the server.

* * * * *